United States Patent [19]
Alexander, Jr.

[11] Patent Number: 5,597,353
[45] Date of Patent: Jan. 28, 1997

[54] COMPACT APPARATUS FOR EVERTING A LINER AND METHOD

[75] Inventor: Joseph A. Alexander, Jr., Memphis, Tenn.

[73] Assignee: Insituform (Netherlands) B.V., Netherlands

[21] Appl. No.: 320,506

[22] Filed: Oct. 7, 1994

[51] Int. Cl.⁶ .................................................. B29C 63/36
[52] U.S. Cl. ..................... 425/387.1; 156/287; 156/294; 264/516; 118/254; 118/DIG. 10; 425/392
[58] Field of Search .................................. 425/387.1, 11, 425/392; 118/254, DIG. 1; 156/423, 287, 294; 264/36, 267, 269, 516, 570

[56] References Cited

U.S. PATENT DOCUMENTS

| | | | |
|---|---|---|---|
| 4,368,091 | 1/1983 | Ontsuga et al. | 156/287 |
| 4,948,452 | 8/1990 | Morinaga et al. | 425/387.1 |
| 5,108,533 | 4/1992 | Long et al. | 156/423 |
| 5,167,901 | 12/1992 | Driver et al. | 264/570 |
| 5,374,174 | 12/1994 | Long | 156/423 |
| 5,454,401 | 10/1995 | Kamiyama et al. | 156/287 |

FOREIGN PATENT DOCUMENTS

WO92/05944  4/1992  WIPO.

*Primary Examiner*—Khanh P. Nguyen
*Attorney, Agent, or Firm*—Cowan, Liebowitz & Latman, P.C.; Michael I. Wolfson

[57] ABSTRACT

A compact apparatus for everting a liner utilizing fluid pressure after the liner has been aligned with the conduit to be lined is provided. The apparatus includes a sphincter valve with its axis aligned with the conduit to be lined and an eversion pressure chamber overlapping a portion of the sphincter valve for reducing the length of the apparatus and allowing positioning in a sewer manhole. A downtube is positioned at the input side of the sphincter valve which can extend to the top of the manhole. To install a liner, the apparatus is placed in the entrance manhole with the sphincter valve aligned with the axis of the sewer pipe, the liner is inserted into the downtube, turned to align with the sphincter valve and conduit and fluid pressure is applied to the valve to engage the flattened liner which after passing through the valve is everted by fluid pressure as it enters the sewer pipe.

25 Claims, 7 Drawing Sheets

COMPACT APPARATUS FOR EVERTING A LINER AND METHOD

BACKGROUND OF THE INVENTION

This invention relates to an improved apparatus for everting a tube or liner used in the lining of existing conduits and a method of everting the liner using the apparatus, and more particularly to an improved apparatus of smaller size than previously available which allows placing the apparatus in the same plane as the conduit to be lined which is not in the same plane as the stored liner, such as the bottom of a manhole when relining a sewer line or other underground pipeline.

A well-known process for rehabilitation of existing conduits, pipelines and passageways generally utilizing a flexible liner to be cured in place is the "Insituform®" method. This method is described in U.S. Pat. No. 4,009,063 for METHOD OF LINING A PIPE and No. 4,064,211 for LINING OF PASSAGEWAYS, both to Eric Wood, the contents of which are incorporated herein by reference. In the later issued patent, a tube impregnated with resin is everted into the conduit utilizing a head of water. The head of water required to evert an 8-inch liner is approximately 23 feet. This requires a scaffolding structure of this height to support the tube and water. This procedure and an alternative apparatus is described in prior U.S. Pat. No. 5,154,936 for Apparatus for Everting of Tube which issued on Oct. 13, 1992 and No. 5,167,901, for Method for Everting a Tube which issued on Dec. 1, 1992, in which I was a co-inventor and which are assigned to Insituform Licenses BV. The contents of these prior patents are incorporated herein by reference.

The apparatuses and methods for everting a tube or a liner for relining a conduit, such as a sewer pipe, gas line or water pipe described in U.S. Pat. Nos. 5,154,936 and 5,167,901 have been satisfactory. These available devices are capable of everting a tube impregnated with resin up to 18 inches in diameter. However, the design is heavy and this makes it difficult to handle in the field. Typically, such apparatuses are about six feet in height and about three feet in diameter. Since there is significant application and installations of diameters of 12 inches and smaller, it is evident that downsizing of such an apparatus and modifying the method to make it more efficient is highly desirable.

Accordingly, it is desirable to provide a compact apparatus and method for everting a tube or liner, especially an apparatus and a method of everting a tube which is more compact and efficient than presently available.

SUMMARY OF THE INVENTION

Generally speaking, in accordance with the invention, a compact apparatus for everting a liner and a method for everting the liner are provided. The apparatus is sufficiently compact and efficient to allow placing the apparatus at the bottom of a sewer manhole with the outlet aligned with a sewer pipe to be lined and rehabilitated. The everting apparatus includes an elbow for aligning the flattened liner with the conduit to be lined and a sphincter-type valve formed by a tubular bladder which is selectively deformed by fluid pressure to engage the flattened liner, yet allow it to pass through to the valve outlet to an eversion boot at the outlet of the apparatus where the liner is everted.

The liner is mounted on the outlet end of the tubular eversion boot which has an inlet for pressurized fluid to evert the liner. The eversion boot overlaps the tubular sphincter-type valve which allows for shortening the portion of the device aligned with the conduit. A down tube which can extend to the top of a manhole, or any convenient height, is mounted on the inlet side of the valve for directing the flattened liner to the sphincter-type valve which is then turned to align with the conduit to be lined and passed through the valve to the eversion boot.

Accordingly, it is an object of the invention to provide an improved apparatus for everting a tube or liner.

Another object of the invention is to provide a compact apparatus for everting a tube or liner which can be placed into a sewer manhole for lining a sewer pipe.

Still another object of the invention is to provide an improved apparatus for everting a tube or liner wherein the energy of the everting fluid is directed to eversion and not overcoming frictional forces of handling and directing the everted tube.

A further object of the invention is to provide an improved apparatus for everting a tube wherein the tube is bent to be aligned with the pipeline or passageway to be relined prior to introduction of the everting fluid against the tube.

Still a further object of the invention is to provide an improved method for everting a tube.

Yet another object of the invention is to provide an improved method for everting a tube for rehabilitating an underground sewer line.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and the arrangement of parts which are adapted to effect such steps and constructions, all exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
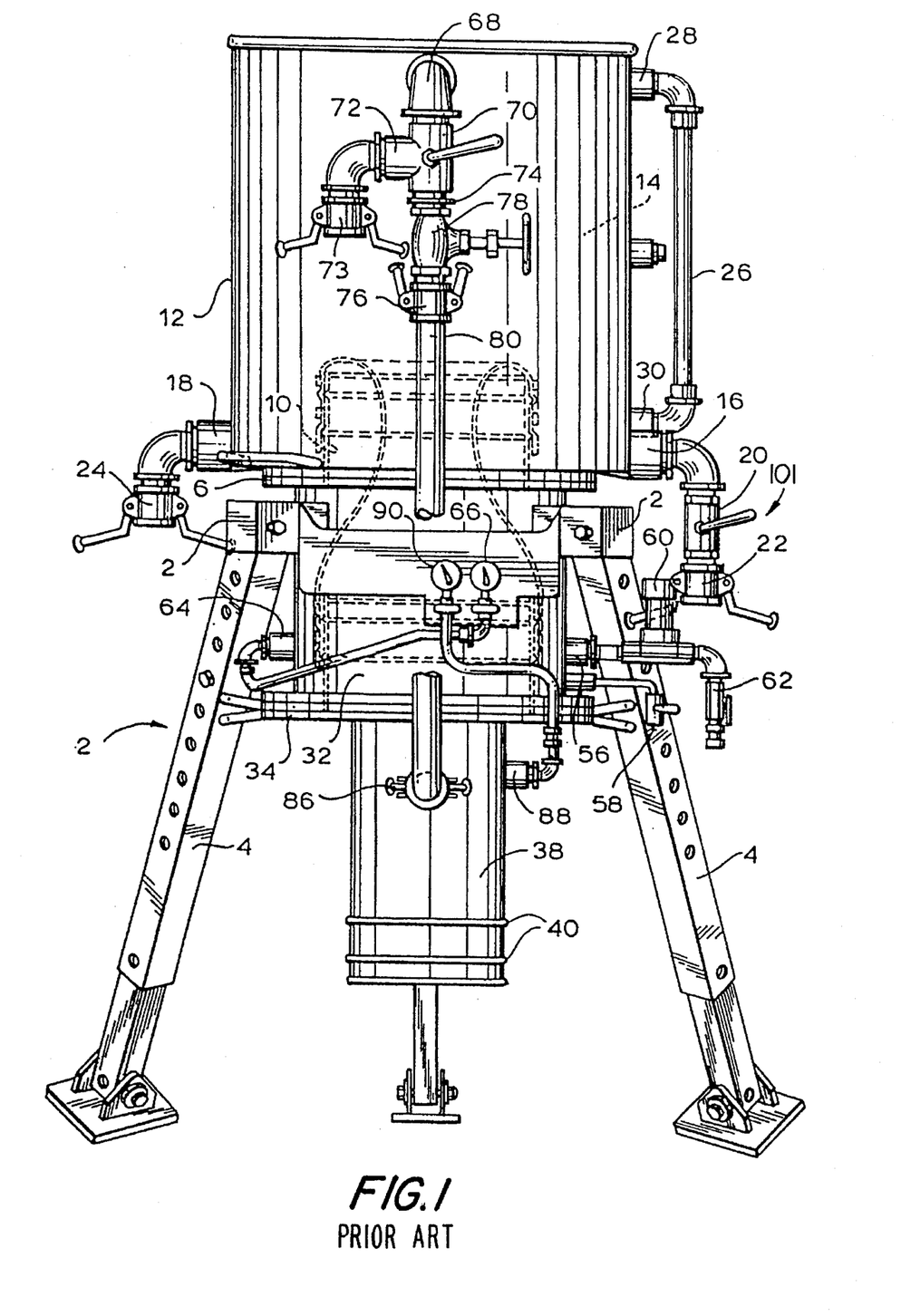
FIG. 1 is an elevational view of an apparatus for everting a tube in accordance with the prior art.
Figure 2:
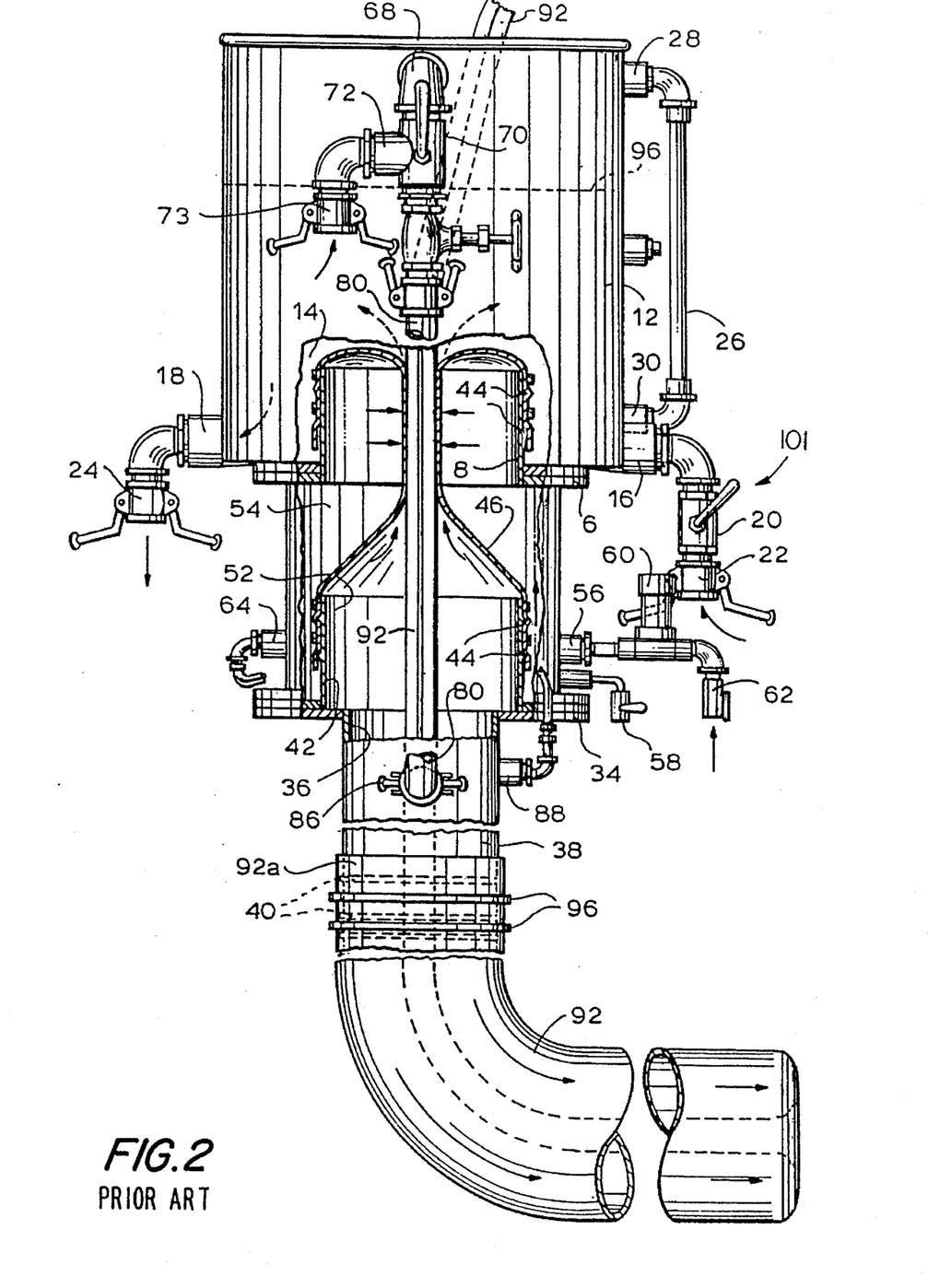
FIG. 2 is an elevational view of the apparatus of FIG. 1 showing the operative portions partially broken away with a tube to be everted in place and in the process of being everted.

A tube eversion apparatus 101 on a support frame 2 for everting a tube as described in U.S. Pat. No. 5,154,936 is illustrated in FIGS. 1 and 2. Adjustable legs 4 are provided for supporting apparatus 101 on a surface. Fixed to support frame 2 is a first bottom wall 6 which is centrally apertured at 8 and which carries an upstanding cylinder 10. Carried by bottom wall 6 is a cylindrical side wall 12 open at its top and defining therewithin a first chamber 14. A fluid inlet fitting 16 and a fluid outlet fitting 18 are provided adjacent the lower portion of chamber 14, with fluid inlet fitting 16 communicating with a control valve 20 and a fluid connector 22, and outlet fitting 18 communicating with a fluid connector 24. A sight glass 26 communicates at 28 and 30 with the upper and lower portions of chamber 14 so that the level of fluid in that chamber can be seen.

Depending from first bottom wall 6 is a second cylindrical wall 32 to which a second bottom wall 34 is connected. Second bottom wall 34 is constructed of three segments 34A, 34B, 34C, with 34C being apertured at 36, and there carrying a downwardly depending cylindrical wall 38 which is open at its bottom end and which is provided with external ribs 40 adjacent that bottom end. A cylindrical wall 42 extends up from second bottom wall 34B around aperture 36. Wall 42, as well as cylindrical wall 10, are preferably provided with ribs 44 on their exterior. Wall 38, permanently attached to segment 34C, is readily removable from segment 34B, thus facilitating the changing of diameter of wall 38 when a tube of a different diameter is being everted.

A sphincter-type valve 45 formed by a flexible wall 46 of a suitable flexible rubbery or plastic material in tubular form is secured to and extends between cylindrical walls 10 and 42. Wall 46 of valve 45 is sealingly held in place on the exterior of wall 42 and against ribs 44 thereon by straps 48. Wall 46 extends up through the interior of cylindrical wall 10 and is secured to the exterior thereof, sealingly pressed against ribs 44 thereon by means of straps 50. Wall 46 may be formed of a sheet of polyvinyl chloride reinforced with nylon.

The space inside wall 38 and wall 42 defines a second chamber 52 and the space between flexible wall 46, cylindrical wall 10 and side wall 32 defines a third chamber 54. Wall 32 is formed with a fluid inlet 56 which communicates with a pressure adjusting means 60 and a joint 62 adapted to be connected to an external source of fluid under pressure. Wall 32 is also provided with an access fitting 64 which communicates with a pressure indicator 66. Wall 32 is also provided with yet another access fitting which communicates with an exhaust control valve 58 (FIG. 2).

A pipe 68 extends through wall 12 adjacent its upper open end and, externally of wall 12, communicates with a valved joint 70 having inlet fitting 72 and outlet fitting 74, the latter communicating with a connector 76 via a valve 78. The end of pipe inside chamber 14 defines a nipple. Connector 76 connects to hose 80 which extends down to wall 38 and there communicates with a connector 86 and an inlet opening through the wall 38. Wall 38 is provided with an outlet fitting 88 which communicates with a pressure indicator 90.

Figure 3:
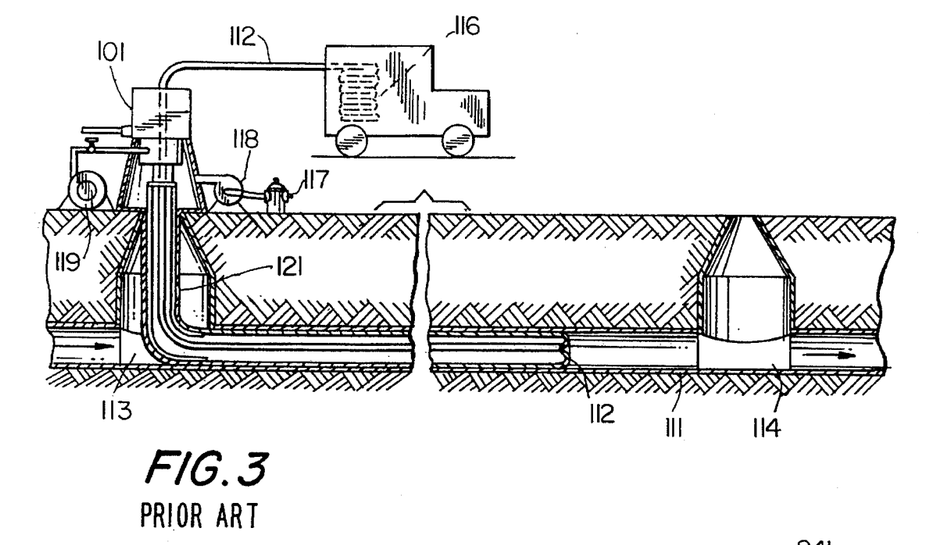
FIG. 3 is a schematic in elevation showing installation of a resin impregnated flexible cured in place liner to rehabilitate an existing sewer conduit utilizing an apparatus of the type illustrated in FIGS. 1–2.

Apparatus 101 is used for the eversion of a tube 92 shown in FIG. 2 into a remote conduit such as an underground sewer pipe 111 as shown in FIG. 3. Tube 92 may be a resin-impregnated felt liner 112 as shown in FIG. 3 which is designed to function, after the resin in the felt has been cured, as a lining for sewer pipe 111 or the like into which it has been introduced, substantially as described in the aforementioned Wood U.S. Pat. No. 4,064,211. Once liner 112 has been everted into position in preparation to line sewer pipe 111, heated fluid is provided inside liner 112, heated fluid serving to retain the liner firmly against the inside of sewer pipe 111 and to provide the heat necessary to cause the resin to set. This fluid is provided through a lay-flat hose 94 having a leading end 94a and a trailing end 94b. Leading end 94a is secured to the trailing end of flattened liner 112.

FIG. 3 illustrates rehabilitation of existing conduit 111 between a first upstream manhole 113 and a second downstream manhole 114 by installation of impregnated liner 112. Use of apparatus 101 provides the pressure needed to evert liner 112, but without having to employ a physical fluid head of appropriate magnitude, as follows. Impregnated flexible liner 112 is generally provided in a flattened condition 116 and is fed down through chambers 14 and 52. Its leading end 112a is cuffed back over the outer surface of the cylinder 38 and is secured by straps 96, thus closing the lower end of chamber 52. Valve 20 is opened and fluid such as water from a hydrant 117 and a pump 118 or other fluid source, is fed through inlet 16 into chamber 14. The level of that fluid in chamber 14 rises, then spilling over the top of the flexible wall 46 into chamber 52. Escape of water from the bottom of chamber 52 being prevented by the cuffed back liner 112. Outlet 18 is connected to the suction end of a fluid pump which at this point in time is turned off, so that water cannot escape from outlet 18. Fluid from hydrant 117 continues to be supplied until the water level in chamber 14 reaches a desired height, such as is indicated at 96 in FIG. 2, at which time valve 20 is closed.

Fluid, generally air under pressure from an air pump 119 (FIG. 3), is supplied via connector 62 and pressure adjustment valve 60 and inlet 56 to chamber 54. This presses wall 46 sealingly against a substantial length of liner 112, thus separating chambers 14 and 52. The pressure provided to chamber 54 is preferably air pressure, and is selected so as to effectively substantially seal off the upper end of chamber 52 while permitting liner 112 to slide therethrough.

Next, fluid under pressure, preferably water, is provided to chamber 52 as the pressure needed to evert liner 112. For example, in order to evert a tube 92 having an internal diameter of approximately 8 inches, a water pressure of approximately 8 pounds per square inch gauge is needed. By providing a pressure within the chamber 54 only somewhat larger, perhaps by 1 pound per square inch, than the water pressure in chamber 52, the 8 pounds per square inch pressure within chamber 52 is contained. As shown in FIGS. 2 and 3, by reason of that pressure, liner 112 is progressively everted and extended out from apparatus 101 into a down-tube 121 and fed into conduit 111. The trailing portion of liner 112 slides through sphincter-type valve 45 defined by wall 46. The pressure of wall 46 on tube 92 sliding therethrough exerts a braking force on the everting tube. Adjustment of valve 78 or pressure adjusting means 60 can provide for variation in the everting pressure. Since the pump which provides the water under pressure for chamber 52 gets its supply of water from chamber 14 via outlet 18, during this eversion process the supply of water in chamber 14 is maintained essentially constant by controlling the inflow of water from the hydrant through adjustment of valve 20. Because of the relatively high pressure of the water in chamber 52 some of it may escape between wall 46 and liner 112, but that escape will be inhibited by the water within chamber 14.

Leading end 94a of lay flat hose 94 is connected to trailing end 92b of liner 92 by line 98. Trailing end 94b of lay flat hose 94 is connected to a nipple at the end of pipe 68 on the interior of wall 12. The eversion process continues until trailing end 92b of liner 92 is close to the open top of chamber 14, with hose 94 sliding through sphincter valve 45 defined by wall 46, until the eversion is complete. During the latter portion of that eversion, after trailing end 92b of tube 92 has moved through wall 46 and into chamber 52, the fluid pressure within chamber 54 will cause wall 46 to sealingly engage lay flat hose 94, thus effectively closing the upper end of chamber 52 but permitting lay flat hose 94 to slide therethrough. The sphincter valve pressure may be adjusted by pressure-adjusting means 60 to accommodate for physical differences between tube 92 and hose 94, if called for, in order to maintain the integrity of the fluid pressure developed in chamber 54.

When eversion is complete liner tube 92 is within sewer pipe 111 and is pressed against the interior of pipe 111 by the pressure of the everting water. The external pump then provides heated fluid such as water and valve 70 is adjusted so that the flow of that heated water is directed through pipe 68 into lay flat hose 94. Heated water then escapes from leading end 94a of lay flat hose 94 and circulates back through the length of liner 112. The pressure exerted on sphincter valve 45 may be adjusted to facilitate flow of the heated fluid through the sphincter valve if such adjustment is appropriate. This procedure continues for the period of time needed to cause the resin within tube 92 to set. The pressure in chamber 54 may be adjusted to provide for optimum functioning during this period, that being accomplished through adjustment of valve control 60. Alternatively curing may be by any other known means, such as by application of heat, various forms of radiation, ultrasonics or other means. After curing flexible liner 112 becomes the new primary containment pipe within existing conduit 111.

Multiple inflation liners may also be used as described in European Application 90905593, assigned to the assignee herein and incorporated herein by reference.

Figure 4:
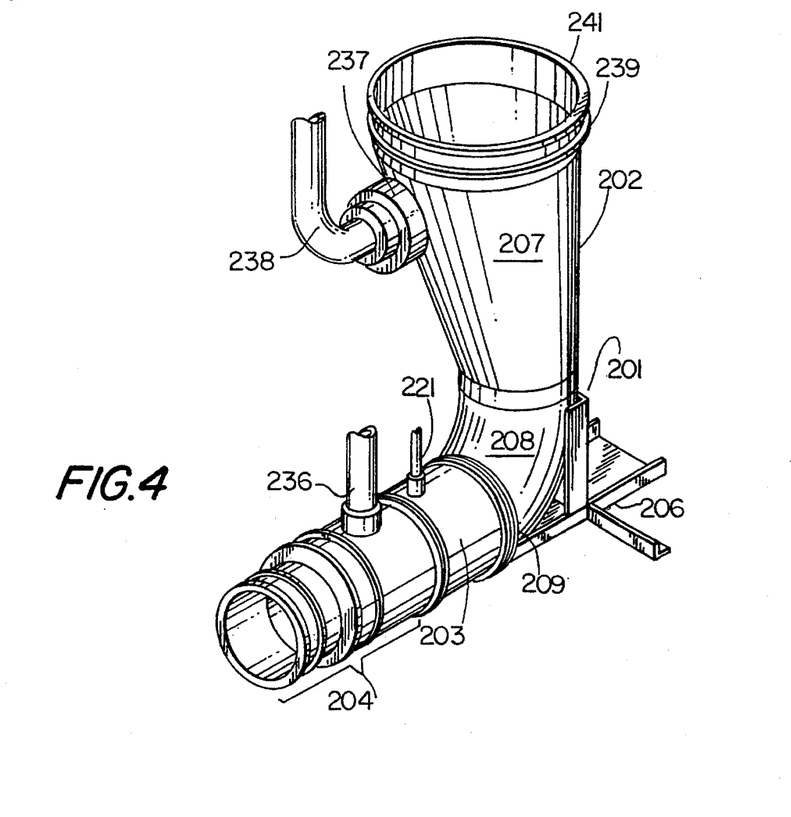
FIG. 4 is a perspective view of a compact apparatus for everting a liner constructed and arranged in accordance with the invention.

A compact apparatus for everting a liner constructed and arranged in accordance with the invention is shown generally at the 201 in FIG. 4. Everting apparatus 201 is assembled from three principal tubular elements as follows and includes a sphincter-type valve 203 similar in construction and operation to valve 45 of apparatus 101. At the inlet side of valve 203 is an inlet tank 202. The outlet end of sphincter-type valve 203 is coupled to an eversion boot 204. Eversion boot 204 at the bottom outlet of apparatus 201 will readily accommodate 6, 8 and 9 inch diameter liners when the lower banding regions are between 5 and 7 inches in diameter. For 10 and 12 inch diameter liners, a larger diameter valve with banding regions between 8.5 and 10 inches in diameter will be required. In alternative embodiments, eversion boot 204 may be removed and replaced with an eversion boot of a different diameter in order to accommodate a change in the diameter of the liner or tube to be everted.

Apparatus 201 may be supported upright on a flat surface by a simple metal rail frame 206 as shown in FIG. 4. Frame 206 is not necessary when apparatus 201 is placed into the invert in a sewer manhole with a downtube as it will be properly oriented vertically. Placement in a sewer manhole is facilitated by the overall dimensions of apparatus 201 which are about two feet wide and about two feet high.

Figure 5:
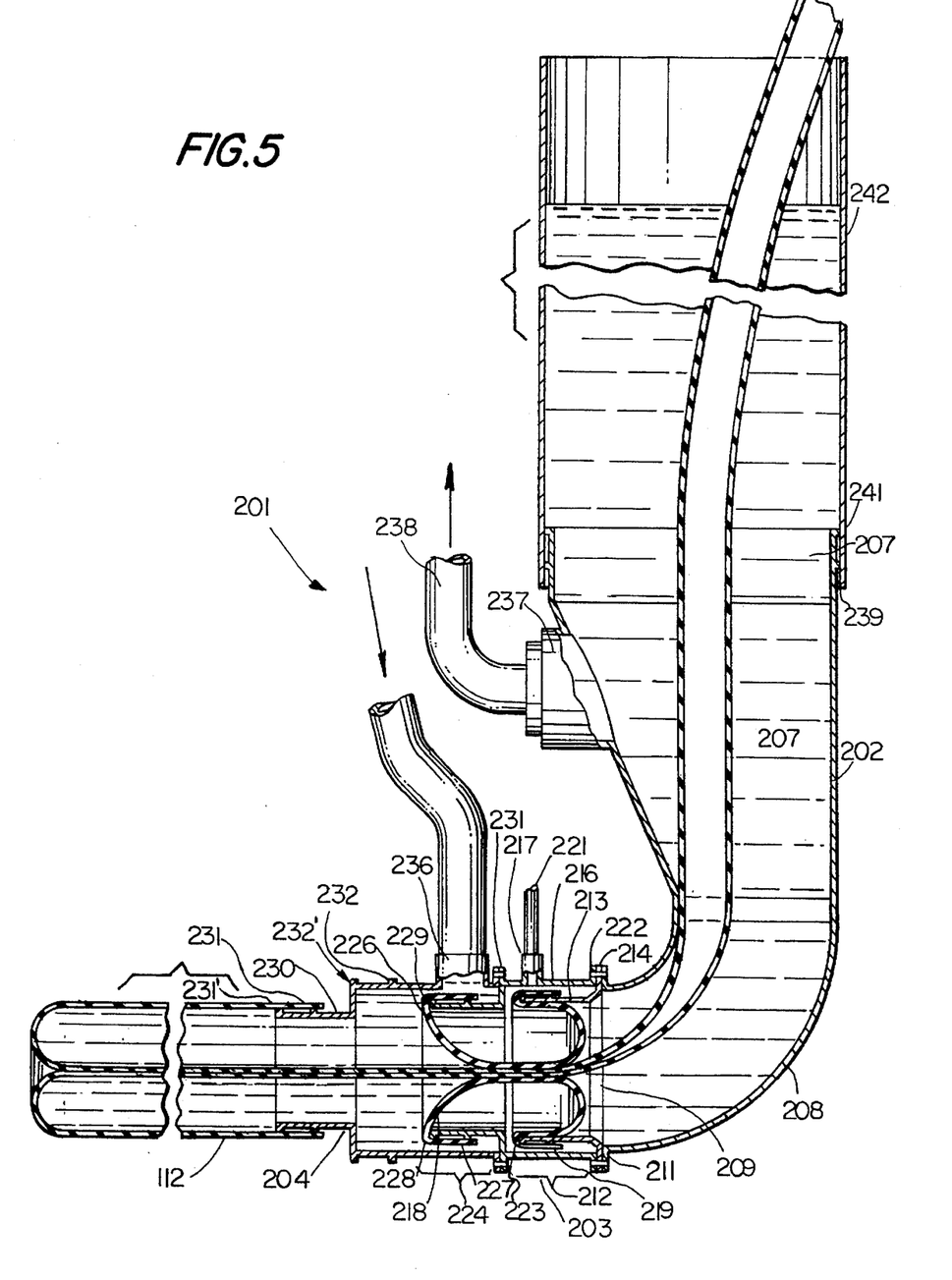
FIG. 5 is a side elevational view of the apparatus for everting a liner of FIG. 4 partially broken away to show a liner to be everted in place.
Figure 6:
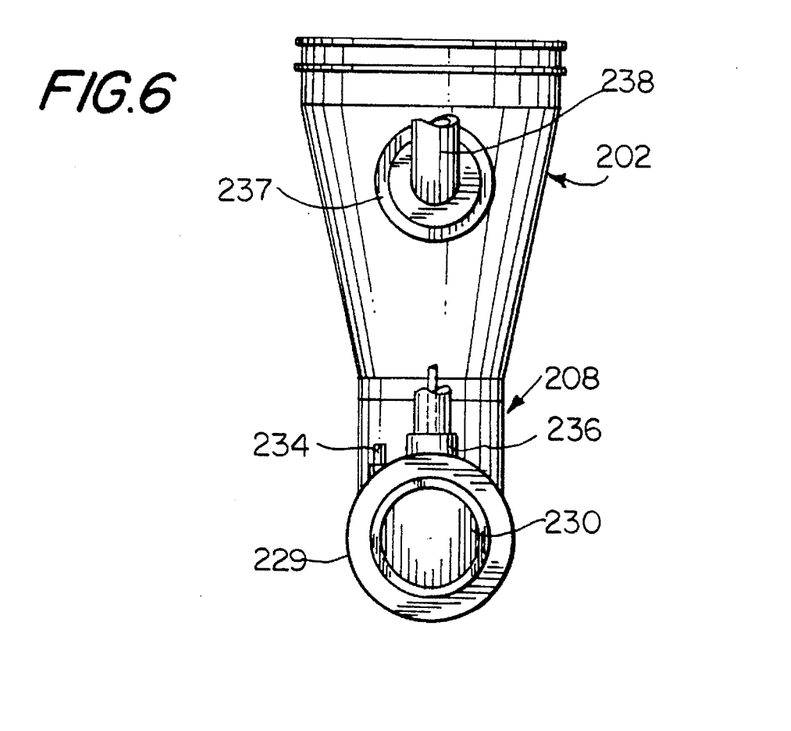
FIG. 6 is a front elevational view of the apparatus for everting a liner of FIG. 4.
Figure 7:
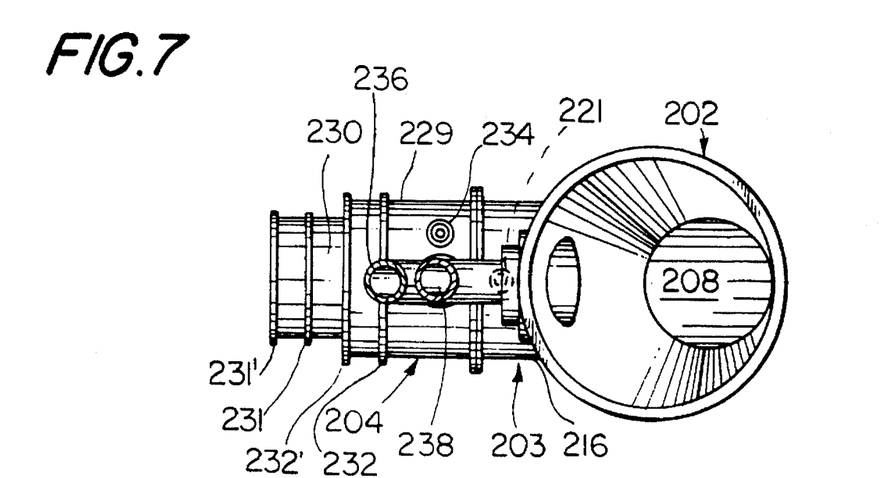
FIG. 7 is a top plan view of the apparatus for everting a liner of FIG. 4.

Inlet tank 202 is formed with a conical inlet portion 207 which is substantially vertical and has an open upper inlet end 207' as shown in FIG. 5. Inlet tank 202 extends to a bent elbow portion 208 having an outlet at 209 which is oriented in a substantially horizontal direction. Outlet 209 includes an outlet flange 211 which is fixedly secured to outlet 209 of elbow portion 208.

Sphincter-type valve 203 is formed from a substantially cylindrical upper valve boot 212 which includes an upper valve cylindrical wall 213 fixed to an upper valve flange 214 which is secured to elbow flange 211. The outlet end of valve wall 213 has external ribs 216 and 217 for securing a flexible tubular bladder 218 thereto with straps in the usual manner.

The outer portion of valve 203 is formed from a substantially cylindrical outer wall 219 formed with a fluid inlet coupling 221 for receiving a pressurized fluid inlet, such as an air pressure hose. Secured to the outlet side of external valve wall 219 on the inlet side is an upper flange 222 secured to upper valve boot flange 214 and outlet flange 211 of elbow 208. A lower outlet valve flange 223 is fixed to the outlet end of wall 219.

A lower valve boot 224 is formed from a cylindrical wall 226 extending from the outlet side of lower valve flange 223. Lower valve boot wall 226 is formed with external ribs 227 and 228. Valve 203 is completed by fixing flexible tubular member 218 about upper valve boot wall 213 and lower valve wall 224 in a conventional manner as in the case of valve 65 with straps between ribs 216 and 217.

Eversion boot 204 forms the outlet of apparatus 201 and is formed from a substantially cylindrical eversion boot wall 229 fixed to an inlet flange 231 which secures eversion boot 204 to outlet flange 223 of outer valve wall 219. Eversion boot wall 229 is formed with an eversion fluid inlet coupling 236, for coupling to a source of pressurized fluid, such as water, when the everting fluid is water. Pressurized air can be forced into the everting liner through inlet coupling 236 to evert with air and water, or to increase the exerting pressure when everting with water.

A secondary coupling 234 is also formed in wall 229 for coupling a pressure gauge thereto for reading the eversion pressure. Two external ribs 232 and 232' are formed at the outlet end of wall 229 for securing the leading end of liner 112 thereto at the start of the eversion process. A secondary installation boot wall 230 may be welded to the outlet of wall 229 for providing a second and smaller boot for securing the everting liner. Secondary wall 230 is also formed with ribs 231 and 231' to facilitate banding the liner thereto.

Inlet tank 202 is formed with a fluid outlet coupling 237 for securing a fluid outlet line 238 for returning water in inlet tube 202 to the circulating pump. An outlet line 238 attached to coupling 237 can be valved so as to control the amount of fluid in inlet tank 202. Level indicators can also be formed on inlet tank 202. The outer wall of open inlet portion 207 of inlet tank 202 is formed with external ribs 239 and 241 to facilitate mounting of a downtube 242, if desired as shown in the schematic illustration during eversion and installation in FIGS. 8 and 9.

Figure 8:
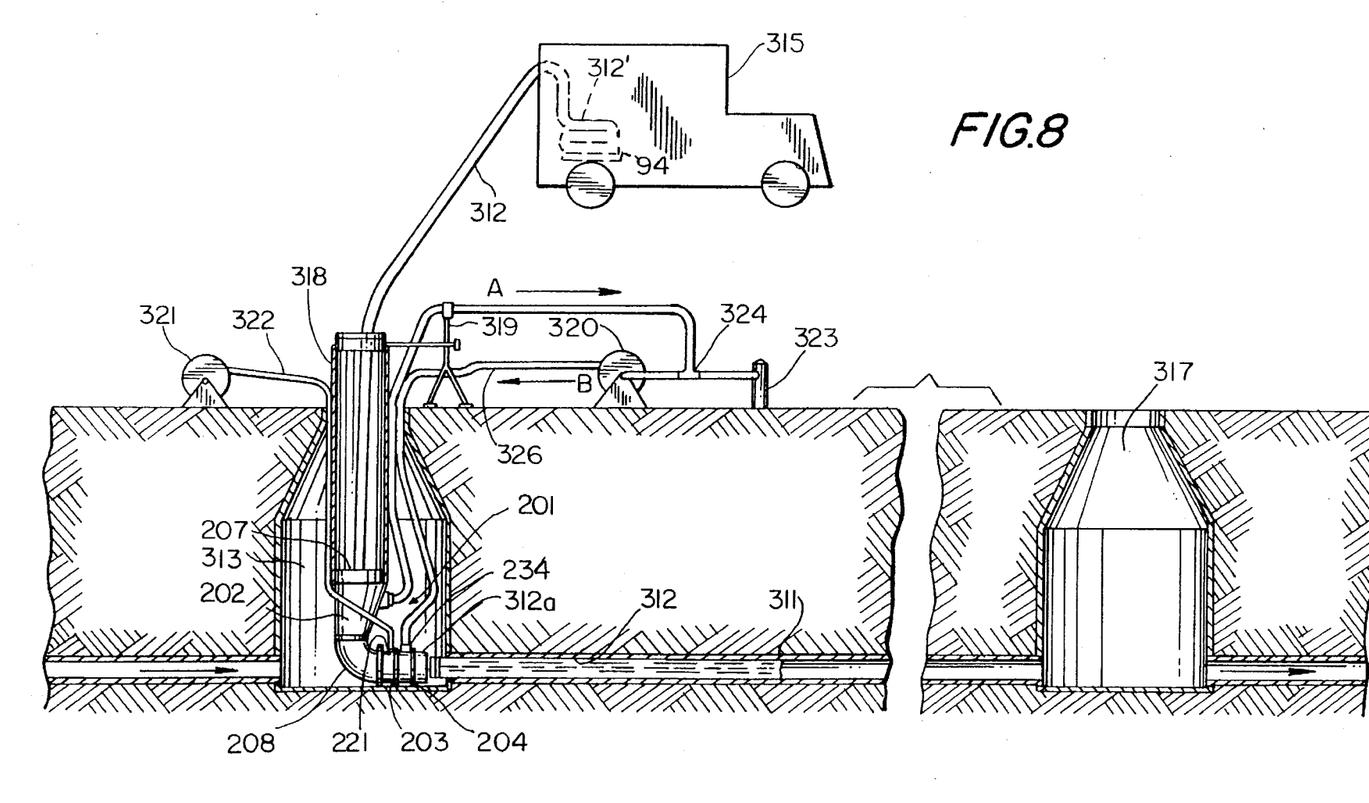
FIG. 8 is a schematic in elevation showing installation of a flexible cured in place liner to rehabilitate an existing sewer conduit utilizing the apparatus of FIG. 4 in accordance with the invention partially broken away to show the liner being everted.

Apparatus 201 constructed and arranged in accordance with the invention is particularly well suited, because of its compact configuration, for eversion of a resin impregnated liner 312 into a remote conduit such as underground sewer pipe 311 of FIG. 8. In this process, liner 312 will be fed into and through apparatus 201 which is then lowered into an inlet manhole 313 for lining an existing sewer pipe 311 with liner 312 to a downstream manhole 314. A downtube 318 supported by a stand 319 is affixed to inlet 207 of inlet tank 202 in order to support apparatus 201 and to facilitate feeding of impregnated liner 312 through apparatus 201. In the following description reference to apparatus 201 and its elements utilizes the reference numerals and elements of apparatus 201 as shown in detail in FIGS. 4–7.

In the method for installing liner 312 into conduit 311, liner 312 is generally provided in a flatted and layered condition 312', as is liner 112 at 116 in FIG. 3. Liner 312 is stored in a service vehicle 315 and is continuously fed into downtube 318 through inlet opening 207, through sphincter valve 203 and exits at eversion boot 204 in the same manner as in apparatus 201. At this point the leading end 312a of liner 312 is fixed to the end of eversion boot 204. Fluid pressure such as air, from an air compressor 321, is applied to sphincter valve 203 through an air inlet line 322 at coupling 221. A flattened lay flat hose 94 is affixed to the end of flattened liner 312. When air pressure is applied to sphincter valve 203, this effectively seals off the interior of eversion boot 204 from inlet chamber 202.

Fluid under pressure, preferably water from a hydrant 323, is fed by an external pump 320 to eversion boot 204 through a valved coupling 324 to a water line 326 to primary inlet coupling 234. Since sphincter valve 203 is compressed about liner 312 the pressurized fluid forces everting tube 312 out the outlet of eversion boot 204 into sewer line 311. During this everting aspect of the installation, water flows from pump 320 to eversion boot 204 into everting liner 312. Water escaping into inlet tank 202 through valve 203 is returned via outlet coupling 238 to pump 320. The water flows in a generally clockwise direction as shown by arrows A and B.

Figure 9:
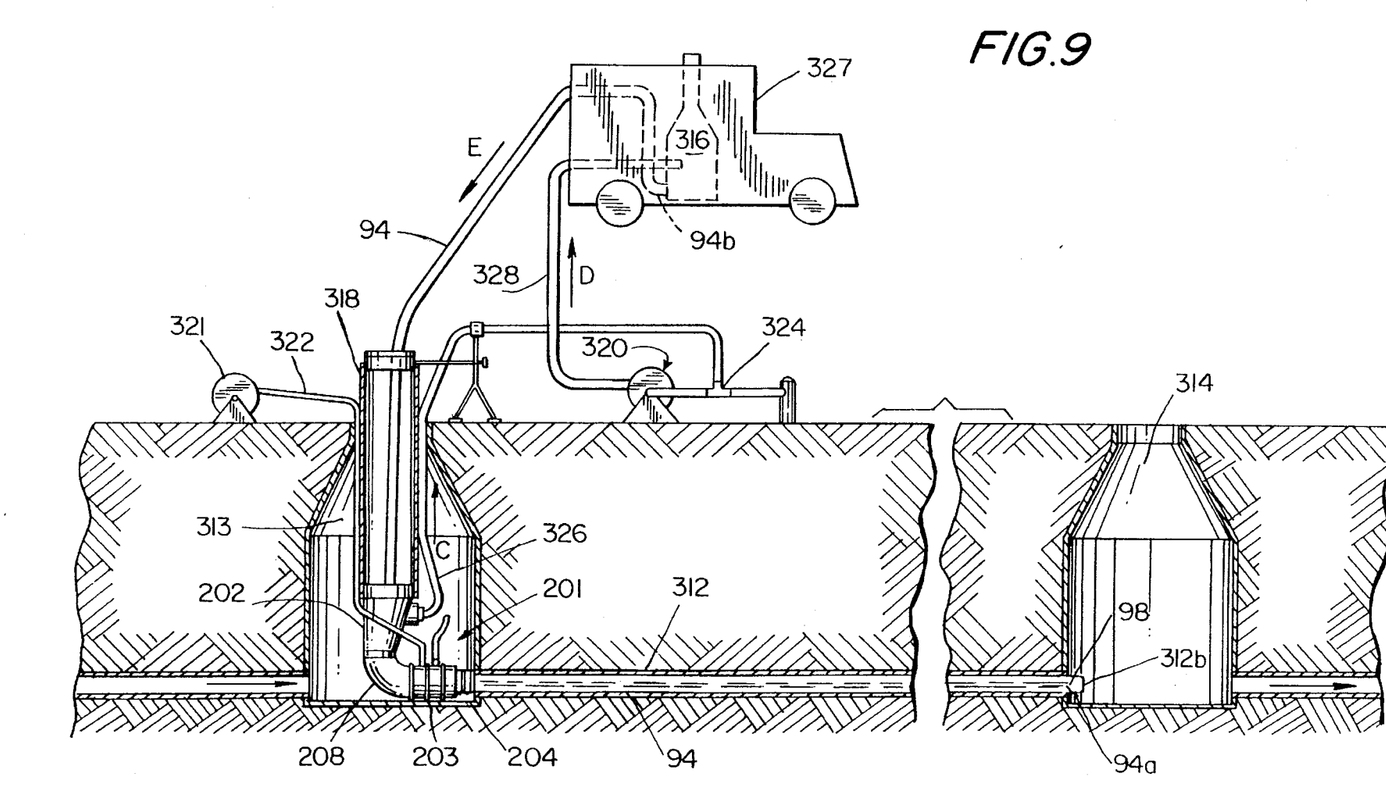
FIG. 9 is a schematic drawing similar to FIG. 8 with the liner fully everted and with a lay flat hose in position and hoses rearranged for supply curing fluid.

Eversion then continues with hose 94 sliding through sphincter valve 203 until eversion is complete as shown in FIG. 9. Leading end 94a of lay flat hose 94 is connected to the trailing end 312b of liner 312 and lay flat hose 94 is connected to the source of curing fluid. During the latter portion of eversion, after trailing end 312b of liner 312 has moved through valve 203 and into eversion boot 204, the fluid pressure within boot 204 causes sphincter valve flexible wall 218 to engage lay flat hose 94 closely, thus effectively closing the upper end of eversion boot 204, but permitting lay flat hose 94 to slide therethrough. Sphincter valve pressure may be adjusted by a pressure adjusting means to accommodate for physical differences between liner 312 and hose 94. When eversion is complete, lining tube 312 is within sewer pipe 311 and is pressed against the interior of that pipe by the pressure of the everting water.

After the eversion is complete, external eversion pump 320 provides heated fluid such as water to lay flat hose 94 from a boiler 316 provided in a second service vehicle 327. That heated water escapes from leading end 94a of lay flat hose 94 and circulates back through the length of liner 312 into inlet chamber 202 and then out outlet line 326 to coupling 324 and is returned to the inlet of boiler 316 by a water line 328. At this time the flow of heated water from boiler 316 is generally counter-clockwise as shown by arrows C, D and E.

The pressure exerted on sphincter valve 203 may be adjusted to facilitate the flow of the heated fluid through the sphincter valve and/or adjust the pressure on the liner, if such adjustment is necessary. This procedure continues for the period of time needed to cause the resin within liner 312 to set. The pressure in eversion boot 204 may be adjusted to provide for optimum functioning during this period, that being accomplished through adjustment of valve controls fixed to eversion fluid inlet 234 of eversion boot 204 and to sphincter valve 203 at inlet 221.

In a typical embodiment apparatus 201 is approximately two feet in height. The width along elbow 208 to eversion boot 204 is also approximately two feet. This will facilitate ready placement of apparatus 201 within a typical sewer manhole. The use of an eversion boot having a diameter larger than the flexible wall so as to overlap allows for the compact size of apparatus 201. Less everting pressure is required than in prior devices because the liner is first turned and aligned to the conduit to be lined prior to everting. Thus, the pressurized everting fluid is utilized solely to evert the liner and is not required to force an everted liner around various bends into alignment with the conduit to be lined.

It will be seen that the objects set forth above, among those made apparent from the preceding description, are efficiently attained and, since certain changes may be made in carrying out the method and in the apparatus set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features herein described and all statements of the scope of the invention which, as a matter of language, might be said to fall therebetween.

What is claimed is:

1. An apparatus for everting a liner for inserting into an existing conduit to be lined, comprising:

a sphincter valve formed from a tubular flexible wall having an inlet and an outlet mounted to a cylindrical wall of a given diameter;

an eversion boot coupled to the outlet of the sphincter valve and having an outlet at the opposite end, the eversion boot having a diameter larger than the diameter of the tubular member of the sphincter-type valve, wherein an end of said liner to be everted is adapted to be secured to the outside of the eversion boot to close the outlet of the eversion boot;

means for supplying fluid to the sphincter valve to press the flexible wall against the liner selectively as the liner moves through the valve; and means for supplying fluid to said eversion boot at the outlet of the eversion boot closed by the an end of the liner to cause the liner to evert out from the apparatus.

2. The apparatus for everting a liner of claim 1, dimensioned so that the longitudinal axis of the apparatus can be aligned with the longitudinal axis of the existing conduit.

3. An apparatus for everting a liner into an existing conduit to be lined, comprising:

a sphincter valve formed from a tubular flexible wall having an inlet and an outlet mounted to a cylindrical wall of a given diameter;

an eversion boot coupled to the outlet of the sphincter valve and having an outlet at the opposite end, the eversion boot having a diameter larger than the tubular member of the sphincter-type valve with the tubular eversion boot overlapping the tubular flexible wall of the sphincter valves, wherein an end of said liner to be everted is adapted to be secured to the outside of the eversion boot to close the outlet of the eversion boot;

means for supplying fluid to the sphincter valve to press the flexible wall against the liner selectively as the liner moves through the valve; and means for supplying fluid to said eversion boot at the outlet of the eversion boot closed by the an end of the liner to cause the liner to evert out from the apparatus.

4. The apparatus for everting a liner of claim 1, further including:

an inlet tank having an inlet opening and an outlet opening, with the outlet opening aligned with the conduit to be lined and the inlet opening being open for receiving a liner to be everted and a bent region for turning the liner to the outlet opening; and the inlet of the valve coupled to the outlet of the inlet tank.

5. The apparatus for everting a liner of claim 4, wherein the inlet portion of the inlet tank is substantially vertical and the outlet of the inlet tank is substantially horizontal and the sphincter-type valve and outlet are aligned with the outlet of the inlet tank.

6. The apparatus for everting a liner of claim 5, wherein the horizontal dimension of the apparatus is adapted to fit within and rest within the invert at the bottom of a manhole.

7. The apparatus for everting a liner of claim 1, wherein the sphincter valve is formed from a substantially cylindrical outer wall at the inlet end of the sphincter valve, the cylindrical wall of the sphincter valve includes inlet means for supplying fluid pressure to the valve to press against the flexible wall.

8. The apparatus for everting a liner of claim 7, wherein the pressure of the means for supplying fluid to the sphincter valve can be adjusted.

9. The apparatus for everting a liner of claim 7, wherein the inlet means on the wall of the sphincter valve is a pressurized air inlet valve.

10. The apparatus for everting a liner of claim 1, wherein the eversion boot is formed with a fluid inlet and for receiving under pressure fluid to cause the liner to evert.

11. The apparatus for everting a liner of claim 1, further including adjustable fluid pressure means coupled to the fluid inlet of the eversion boot.

12. The apparatus for everting a liner of claim 1, wherein the wall of the eversion boot coupled to the sphincter valve is formed with a stepped down wall region for accommodating a liner of a smaller diameter than the wall of the eversion boot.

13. The apparatus for everting a liner of claim 1, further including means for recirculating fluid from the inlet tank.

14. The apparatus for everting a liner of claim 13, further including control means for controlling the flow of fluid to the inlet tank so as to produce a desired depth of fluid therein coupled to the inlet to the inlet tank.

15. The apparatus for everting a liner of claim 3, further including:

an inlet tank having an inlet opening and an outlet opening, with the outlet opening aligned with the conduit to be lined and the inlet opening being open for receiving a liner to be everted and a bent region for turning the liner to the outlet opening; and the inlet of the valve coupled to the outlet of the inlet tank.

16. The apparatus for everting a liner of claim 15, wherein the inlet portion of the inlet tank is substantially vertical and the outlet of the inlet tank is substantially horizontal and the sphincter-type valve and outlet are aligned with the outlet of the inlet tank.

17. The apparatus for everting a liner of claim 16, wherein the horizontal dimension of the apparatus is adapted to fit within and rest within the invert at the bottom of a manhole.

18. The apparatus for everting a liner of claim 3, wherein the sphincter valve is formed from a substantially cylindrical outer wall at the inlet end of the sphincter valve, the cylindrical wall of the sphincter valve includes inlet means for supplying fluid pressure to the valve to press against the flexible wall.

19. The apparatus for everting a liner of claim 18, wherein the pressure of the means for supplying fluid to the sphincter valve can be adjusted.

20. The apparatus for everting a liner of claim 18, wherein the inlet means on the wall of the sphincter valve is a pressurized air inlet valve.

21. The apparatus for everting a liner of claim 3, wherein the eversion boot is formed with a fluid inlet and for receiving under pressure fluid to cause the liner to evert.

22. The apparatus for everting a liner of claim 3, further including adjustable fluid pressure means coupled to the fluid inlet of the eversion boot.

23. The apparatus for everting a liner of claim 3, wherein the wall of the eversion boot coupled to the sphincter valve is formed with a stepped down wall region for accommodating a liner of a smaller diameter than the wall of the eversion boot.

24. The apparatus for everting a liner of claim 3, further including means for recirculating fluid from the inlet tank.

25. The apparatus for everting a liner of claim 24, further including control means for controlling the flow of fluid to the inlet tank so as to produce a desired depth of fluid therein coupled to the inlet to the inlet tank.

* * * * *